Patented May 9, 1950

2,506,594

UNITED STATES PATENT OFFICE 2,506,594

DERIVATIVES OF DL-HEXAHYDRO-2-OXO-4-(4-HALOALKYL)-1-FURO-(3,4)-IMIDAZOLE AND PROCESS FOR PREPARING SAME

Klaus Hofmann, Pittsburgh, Pa., assignor to Ciba Pharmaceutical Products, Incorporated, Summit, N. J., a corporation of New Jersey No Drawing. Application August 7, 1947, Serial No. 767,319

12 Claims. (Cl. 260—309)

The present invention relates to new and useful chemical compounds—certain furo-imidazole derivatives—which are more particularly characterized by a marked antibiotic activity.

It has been found that compounds which correspond to the structural formula

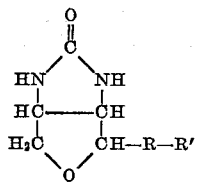

wherein R represents a lower polymethylene group, and R' represents a sulfhydryl group, a thiobenzyl ether group or a sulfonic acid group, are endowed with marked antibiotic activity and are capable of inhibiting the growth of micro-organisms.

The new compounds may be prepared from 3,4-dicarboxy-2-furan-alkanols (see copending application Ser. No. 756,096, filed June 20, 1947), which are acetylated, esterified, converted by a modified Curtius degradation [J. A. C. S. 67, 1459 (1945)] into 3,4-dialkylcarboxyamino-2-furan-alkanols which, by catalytic hydrogenation and ring closure with barium hydroxide, are converted to the dl-hexahydro-2-oxo-4-alkanol-1-furo-3,4-imidazoles. The latter are treated with thionyl chloride, and the resulting chlorides may be converted (a) to the corresponding benzylthioethers by reaction with an alkali metal benzylmercaptide, such as sodiobenzylmercaptide, (b) to the corresponding mercaptoalkanols by reaction with an alkali metal hydrosulfide, such as potassium hydrosulfide, and (c) to the corresponding sulfonic acids by reaction with an alkaline sulfite, such as ammonium sulfite. The benzylthioethers may, if desired, be converted into the corresponding mercaptoalkanols by reduction with sodium and alcohol. The mercaptoalkanols may, in turn, be oxidized with permanganate to the corresponding sulfonic acids.

The foregoing may be schematically outlined as follows:

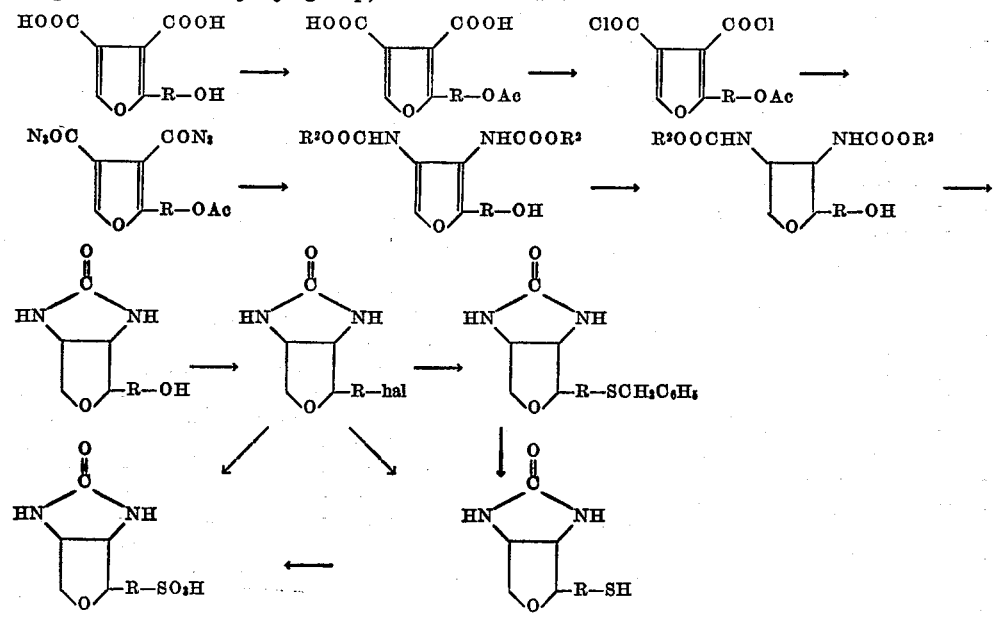

In the above scheme, "hal" stands for chlorine or bromine, and $R^2$ stands for lower alkyl, such as ethyl, propyl, etc. While R is preferably one of —(CH$_2$)$_3$— and —(CH$_2$)$_4$—, the invention is not thus limited and extends to compounds wherein R is any lower polymethylene group, i. e.—(CH$_2$)—$_x$, where $x$ may range from 2 to 6 or more.

The following examples illustrate methods of carrying out the invention, but it is to be understood that the examples are given by way of illustration and not of limitation. The "parts by weight" bear the same relation to "parts by volume" as do grams to cubic centimeters.

Example 1

To a suspension of 30 parts by weight of 3,4-dicarboxy-2-furan-butanol acetate and 150 parts by volume of dry ether are added, in small amounts, with cooling and shaking a total of 52 parts by weight of phosphorus pentachloride. Shaking is continued until most of the phosphorus pentachloride has disappeared and the ether is removed in vacuo at a bath temperature of 40–45° C. 50 additional parts by volume of ether are added to the residue with subsequent removal and this procedure is repeated twice more. The residue is dissolved in 300 parts by volume of ether and stirred vigorously in an ice bath for 2 hours with a solution of 28 parts by weight of sodium azide and 75 parts by volume of water. 70 parts by volume of 40% potassium hydroxide are then added and stirring continued for another hour. The ether layer is separated, the aqueous layer re-extracted with fresh ether, and the ether extracts dried over freshly dessicated sodium sulfate. The dried solution is filtered through a fluted filter half filled with sodium sulfate and the ether is removed in vacuo at a bath temperature of 20° C. The resulting oily azide is dissolved in 300 parts by volume of absolute alcohol and decomposed under nitrogen by heating slowly to 45–50° C. and maintaining the mixture at this temperature until the initial rapid evolution of nitrogen has almost ceased. The temperature is then raised to the boiling point of the alcohol and the solution refluxed for two hours. The solution is cooled to 0° C. and 112.6 parts by volume of normal sodium hydroxide solution are added with stirring. After standing overnight, the alcohol is removed in vacuo, the residue diluted with water and extracted with ether. The ether extracts are washed with 3 portions of 2 normal hydrochloric acid and 1 portion of 10% sodium bicarbonate, dried over sodium sulfate and the solvent evaporated on the steam bath. The resulting oily residue crystallizes on standing. The urethane crystals have a melting point of 77–79° C.

A solution of 10.8 parts by weight of the above urethane in 175 parts by volume of glacial acetic acid are hydrogenated at room temperature and atmospheric pressure in the presence of 22 parts by weight of a palladium-on-barium-sulfate catalyst until 2 mols. of hydrogen have been absorbed (reaction complete in about 2 hours). The catalyst is removed by filtration, the glacial acetic acid is evaporated in vacuo, and 700 parts by volume of 10% barium hydroxide are added to the residue and the mixture heated to 90° C. with stirring for two hours. Carbon dioxide is passed into the hot solution for approximately 30 minutes, the barium carbonate is filtered out and the solution evaporated to dryness in vacuo. The residue is extracted with three portions of 50 parts by volume each, of boiling dioxane which are combined, filtered and concentrated to a small volume. On cooling, dl-hexahydro-2-oxo-4-(4-hydroxybutyl)-1-furo-(3,4)-imidazole is obtained, which when recrystallized from dioxane melts at 154–156° C.

2 parts by weight of the above butanol are placed in a round bottomed flask surrounded with ice and 5 parts by volume of ice-cold thionyl chloride are added at once. The butanol dissolves within a few minutes and the solution is removed from the ice bath and kept at room temperature for approximately 12 hours. The thionyl chloride is then removed in vacuo and the residue dissolved in a mixture of water and ethyl acetate. The ethyl acetate layer is separated and washed with 10% sodium bicarbonate and dried over sodium sulfate. Most of the ethyl acetate is then removed on the steam bath and the residue placed in the refrigerator where crystallization soon occurs. The crystals are washed with ice cold ethyl acetate and recrystallized from the same solvent to yield dl-hexahydro-2-oxo-4-(4-chlorobutyl)-1-furo-(3,4)-imidazole melting at 124–126° C.

To a solution of 0.442 part by weight of the above chloride in 10 parts by volume of absolute alcohol, 1.1 parts by volume of a sodiobenzylmercaptide solution prepared by dissolving 1.2 parts by weight of sodium in a mixture of 19 parts by volume of absolute alcohol and 6 parts by volume of benzylmercaptan are added and the mixture refluxed for two hours. The alcohol is removed in vacuo, the residue dissolved in ethyl acetate, and the solution washed with several portions of water, dried over sodium sulfate and the ethyl acetate removed in vacuo. The oily residue solidifies on standing and the crystals are washed with ether and purified by recrystallization in dilute methanol. dl-hexahydro-2-oxo-4-(4-benzylthiobutyl)-1-furo-(3,4)-imidazole is obtained in the form of silky needles melting at 76–79° C.

To 4 parts by weight of sodium in a round bottomed flask, a solution of 0.5 part by weight of the above thioether in 50 parts by volume of absolute alcohol is added at once and the mixture refluxed until all of the sodium has dissolved. 200 parts by volume of absolute alcohol are then added and carbon dioxide passed into the solution for one hour. The sodium carbonate is removed by filtration and the filter cake repeatedly washed with absolute alcohol. The combined filtrate and washings are evaporated to dryness in vacuo in a stream of carbon dioxide and the residue extracted with three portions of 25 parts by volume each, of hot ethyl acetate. The combined ethyl acetate extracts are filtered and evaporated to dryness in vacuo under carbon dioxide. The resulting crystalline substance is dl-hexahydro-2-oxo-4-(4-mercapto-butyl)-1-furo-(3,4)-imidazole.

To a solution of 0.390 part by weight of the above thiobutanol in 39 parts by volume of water which is cooled in an ice bath, a 0.01 molar solution of barium permanganate is added slowly with stirring until the pink color remains for 20 minutes. (Approximately 174 parts by volume of the solution are required.) The mixture is heated on the steam bath and 2 parts by volume of methanol are added in order to decompose the excess permanganate. The manganese dioxide is removed by filtration and the clear filtrate concentrated to dryness in vacuo. The crystalline residue is suspended in hot 95% ethyl alcohol and water is added until all the barium salt has dissolved. Upon the addition of more hot 95% ethyl alcohol, the barium salt of the sulfonic acid crystallizes in the form of colorless needles which are purified by recrystallization from dilute ethanol.

Example 2

To a solution of 0.538 part by weight of dl-hexahydro-2-oxo-4-(5-chloropentanol)-1-furo-(3,4)-imidazole [J. A. C. S. 69,191 (1947)] in 5 parts by volume of absolute alcohol, 1.3 parts by volume of a sodiobenzylmercaptide (see Example 1) are added and the mixture refluxed for two hours. The benzylthioether is isolated as described in Example 1. Recrystallization from dilute methanol yields needles melting at 66–68° C.

0.500 part by weight of the above thioether are cleaved with sodium in absolute alcohol as described in Example 1 to yield the mercaptide of melting point 92–94° C.

To an ice-cold solution of 0.200 part by weight of the above thiopentanol in 10 parts by volume of water and one part by volume of acetone, a 0.01 molar solution of barium permanganate is slowly added with stirring until the solution remains pink for 30 minutes (approximately 76 parts by volume). The excess of permanganate is destroyed by the addition of 2 parts by volume of methanol and heating on the steam bath, and the solution filtered and concentrated to dryness in vacuo. The residue is dissolved in a small amount of water, acetone is added until the solution becomes cloudy and the barium salt of the sulfonic acid crystallizes out. dl-hexahydro-2-oxo-1-furo-(3,4)-imidazole-4-(pentane sulfonic acid) is obtained in the form of the barium salt which is purified by recrystallization from dilute acetone.

*Example 3*

0.5 part by weight of potassium is dissolved in 25 parts by volume of absolute ethanol and converted to the hydrosulfide by passing in hydrogen sulfide. While refluxing on the water bath and continuing to pass in hydrogen sulfide a solution of 2.2 parts by weight of dl-hexahydro-2-oxo-4-(4'-chlorobutyl)-1-furo-(3,4)-imidazole dissolved in 30 parts by volume of absolute ethanol is added slowly. The mixture is heated for an additional 20 minutes after all the chloride is added. Most of the alcohol is removed in vacuo. To the residue is added 20 parts by volume of water and the solid material filtered off and washed with water in an atmosphere of carbon dioxide. The product, dl-hexahydro-2-oxo-4-(4'-mercaptobutyl)-1-furo-(3,4)-imidazole, is recrystallized from ethyl acetate.

*Example 4*

1.1 parts by weight of dl-hexahydro-2-oxo-4-(4'-chlorobutyl)-1-furo-(3,4)-imidazole and 1.4 parts by weight of ammonium sulfite and 100 parts by volume of 80% ethanol are heated on the steam bath for 3 hours. A solution of 3.15 parts by weight of barium hydroxide in 100 parts by volume of warm water is added and the barium sulfite precipitate filtered off. The filtrate is evaporated to dryness and the barium salt of the sulfonic acid crystallized from dilute ethanol.

In those cases where the sulfonic acid is obtained in the form of the barium salt, the free sulfonic acid can be obtained, if desired, by dissolving the barium salt in water, exactly precipitating the barum ion with sulphuric acid, filtering off the precipitated barium sulfate and evaporating the filtrate to dryness.

Having thus disclosed the invention, what is claimed is:

1. A compound of the formula

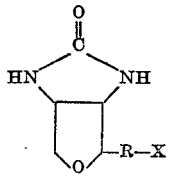

wherein X is a member selected from the group consisting of $SCH_2C_6H_5$, $SH$ and $SO_3H$, and R is a lower polymethylene group.

2. A compound of the formula

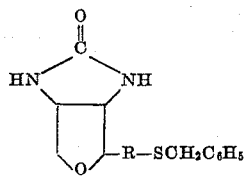

wherein R is a lower polymethylene group.

3. A compound of the formula

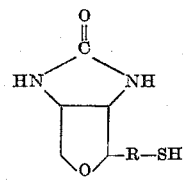

wherein R is a lower polymethylene group.

4. A compound of the formula

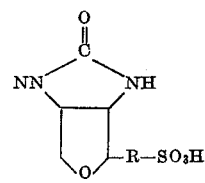

wherein R is a lower polymethylene group.

5. The compound of the formula

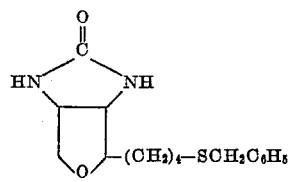

6. The compound of the formula

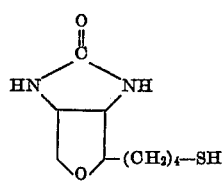

7. The compound of the formula

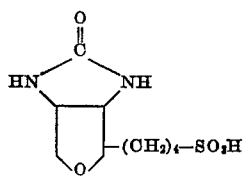

8. In a process for the preparation of an oxybiotin derivative containing sulfur in the side chain of the oxybiotin molecule, the step of reacting a compound of the formula

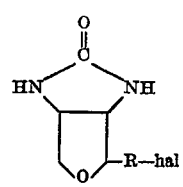

wherein R is a lower polymethylene group and "hal" stands for a member selected from the group consisting of chlorine and bromine, with an agent capable of replacing halogen by a sulfur-containing radical and selected from the group consisting of alkali metal benzylmercaptide, ammonium sulfite and potassium hydrosulfide.

9. In a process for the preparation of an oxybiotin derivative containing sulfur in the side chain of the oxybiotin molecule, the step of reacting a compound of the formula

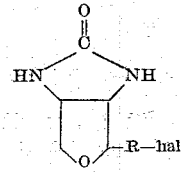

wherein R is a lower polymethylene group and "hal" stands for a member selected from the group consisting of chlorine and bromine, with an alkali metal benzylmercaptide to produce the corresponding benzylthioether.

10. In a process for the preparation of an oxybiotin derivative containing sulfur in the side chain of the oxybiotin molecule, the step of reacting a compound of the formula

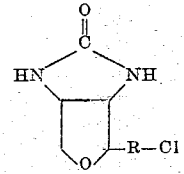

wherein R is a lower polymethylene group, with sodobenzylmercaptide to produce the corresponding benzylthioether.

11. In a process for the preparation of an oxybiotin derivative containing sulfur in the side chain of the oxybiotin molecule, the step of reacting a compound of the formula

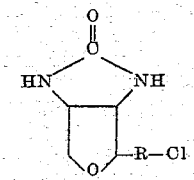

wherein R is a lower polymethylene group, with ammonium sulfite to produce the corresponding sulfonic acid.

12. In a process for the preparation of an oxybiotin derivative containing sulfur in the side chain of the oxybiotin molecule, the step of reacting a compound of the formula

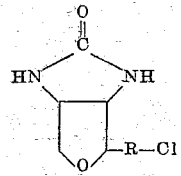

wherein R is a lower polymethylene group, with potassium hydrosulfide to produce the corresponding mercaptoalkanol.

KLAUS HOFMANN.

No references cited.

Certificate of Correction

Patent No. 2,506,594 — KLAUS HOFMANN — May 9, 1950

It is hereby certified that errors appear in the printed specification of the above numbered patent requiring correction as follows:

Column 2, line 48, for the formula "—$(CH_2)$—x"; read —$(CH_2)x$—; column 3, line 64, for "conecntrated" read *concentrated*; column 4, line 13, for "soltuion" read *solution*; column 6, line 27, for that portion of the formula reading

 read 

column 7, line 32, for "soidobenzylmercaptide" read *sodiobenzylmercaptide*; and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*